US008918403B2

(12) United States Patent
Liu et al.

(10) Patent No.: US 8,918,403 B2
(45) Date of Patent: Dec. 23, 2014

(54) SEMANTICALLY RANKING CONTENT IN A WEBSITE

(75) Inventors: Samson J. Liu, Mountain View, CA (US); Suk Hwan Lim, Mountain View, CA (US); Jian-Ming Jin, Beijing (CN); Yuhong Xiong, Mountain View, CA (US); Parag M. Joshi, Los Gatos, CA (US); Nina Bhatti, Los Altos, CA (US); Jerry J. Liu, Sunnyvale, CA (US); Jian Fan, San Jose, CA (US); Sheng-Wen Yang, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 13/635,412

(22) PCT Filed: Apr. 19, 2010

(86) PCT No.: PCT/CN2010/000525
§ 371 (c)(1),
(2), (4) Date: Sep. 15, 2012

(87) PCT Pub. No.: WO2011/130870
PCT Pub. Date: Oct. 27, 2011

(65) Prior Publication Data
US 2013/0114105 A1 May 9, 2013

(51) Int. Cl.
*G06F 17/30* (2006.01)
(52) U.S. Cl.
CPC .............................. *G06F 17/30864* (2013.01)
USPC .......................................................... 707/748
(58) Field of Classification Search
CPC ................................................. G06F 17/30132
USPC ............... 707/2, 3, 6, 636, 748; 709/204–206
See application file for complete search history.

(56) References Cited

U.S. PATENT DOCUMENTS

| | | | |
|---|---|---|---|
| 2006/0015401 A1* | 1/2006 | Chu et al. ........................ | 705/14 |
| 2007/0239701 A1 | 10/2007 | Blackman | |
| 2009/0125516 A1* | 5/2009 | Schonfeld et al. ................ | 707/6 |
| 2010/0185616 A1* | 7/2010 | Baran ........................... | 707/736 |

* cited by examiner

*Primary Examiner* — Etienne Leroux

(57) ABSTRACT

Semantically ranking content in a website (110) with a computerized ranking device (105) includes: parsing content from the website (110) into multiple autonomous content blocks (415-1 to 415-17) with the computerized ranking device (105) and assigning an importance ranking with said computerized ranking device (105) to each of the content blocks (415-1 to 415-17) based on a degree to which a substance of the content block (415-1 to 415-17) is relevant to one of a plurality of predefined categories.

18 Claims, 10 Drawing Sheets

300

| About Us | Contact Information | Map |
| --- | --- | --- |
| 305 | 310 | 315 |

| Category Name | Category Score | Category Keywords |
|---|---|---|
| Home | 10 | home, welcome |
| Contact | 9 | contact, location, address, phone, tel., toll free, email, e-mail, fax, map, directions, city, state, zip |
| Company Description | 9 | about, profile, inc., co., ltd., founded, established, mission, philosophy |
| Special Offers | 7 | special offers, specials, clearance, bargains |
| Testimonials | 7 | testimonial, testimony, gallery, sample |
| Products | 6 | product, service, catalog, samples, cost, gallery |
| Hours | 5 | Monday, Tuesday, Wednesday, Thursday, Friday, Saturday, Sunday, a.m., p.m., hours |
| FAQ | 2 | FAQ, frequently asked questions, Q/A, Q&A |
| Careers/ Employment | 1 | position, requirement, description, email, phone, contractor, resume, apply, employment |
| Links | 1 | links |
| Accounts | 0 | account, your account, register, login, password |
| Reservations | 0 | reservation, appointment, schedule |

*Fig. 8*

SEMANTICALLY RANKING CONTENT IN A WEBSITE

BACKGROUND

It is often the case that an organization will maintain a presence on the internet to provide clients, business associates, and other information seekers with inexpensive and readily accessible information about the organization. Currently, the most common method of achieving this type of internet presence is through a website. Because nearly all people have access to the internet in some way or another, a web site can be very effective in exposing the organization to those seeking information about the organization.

A website maintained by an organization can be the repository of a variety of content. Accordingly, it may be practical under some circumstances to reuse content developed for a website in other types of media, such as printed marketing media. Nevertheless, in the creation of these other types of media, not all of the content on the website is of equal value. For example, the contact information for an organization on a website may be more useful in a printed marketing brochure for that organization than content on the website related to applying online for employment. As a result, it may be a time consuming process to sift through the contents of a website to determine which content is most suitable for reuse in a specific application.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 3 is a diagram of an illustrative template for an article of so media designed to reuse semantically ranked content extracted from a website, according to one exemplary embodiment of principles described herein.

FIG. 8 is a diagram of an illustrative content ranking list, according to one exemplary embodiment of principles described herein

Throughout the drawings, identical reference numbers designate similar, but not necessarily identical, elements.

DETAILED DESCRIPTION

Figure 1:
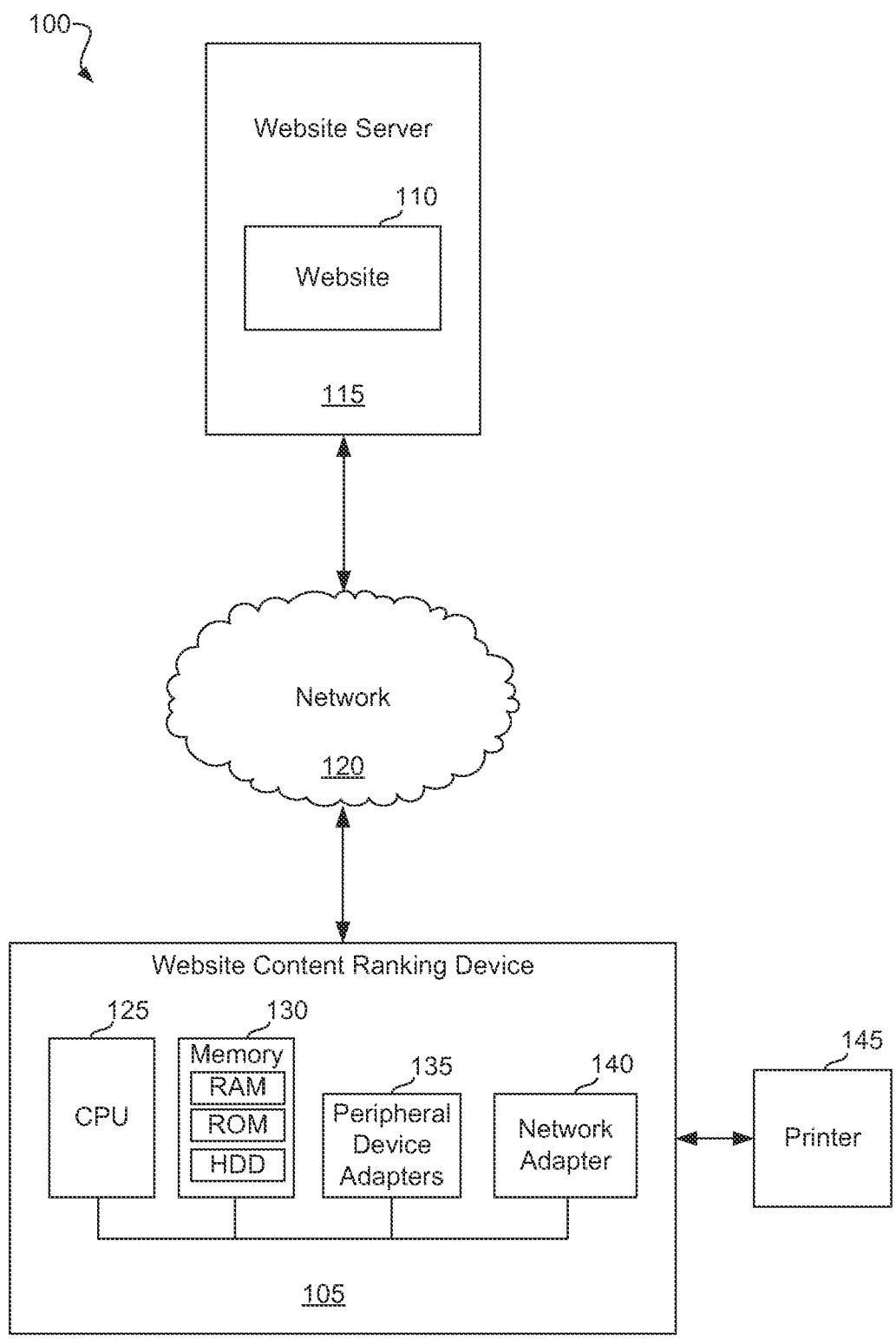
FIG. 1 is a block diagram of an illustrative system for semantically ranking content in a website according to one exemplary embodiment of principles described herein.

As described above, in some cases it may be cost-effective to extract content from a website for reuse in another type of media. However, all content available on the website may not be of equal value or even relevant to the creation of the target article of media. It may be time-consuming and tedious sifting through an entire website to manually extract relevant content for reuse in a target article of media, particularly in the case of a large website. Thus, it may be desirable to provide a way to automatically rank website content semantically for use in creating a target article of media.

In light of these considerations, the present specification discloses various methods, systems, and devices for semantically ranking content in a website. The process of semantically ranking website content includes parsing content from the website into multiple autonomous content blocks, assigning each content block to a predefined category based on the substance of the content block, and ranking each content block according to a degree of importance associated with its assigned predefined category. In certain embodiments, the content blocks may then be automatically assembled according to rank into a target article of media.

The principles described herein advantageously enable the automatic organization of content from a website according to its importance based on a changeable set of semantics, thereby eliminating the need to manually search through an entire website for content suitable for reuse in a desired application. By doing so, the systems, methods, and devices described herein simplify the process of reusing website contents for new applications such that an owner of a website can increase the value of that content.

While the principles set forth in the present specification are described primarily with relation to embodiments in which semantically ranked content is used to automatically generate a document based on information extracted from a website, it will be understood that these principles are not limited to such embodiments. Rather, it is anticipated that the novel principles described herein may also be applied to any other application in which semantically ranked website content may be utilized.

As used in the present specification and in the appended claims, the term "website" refers to a web page or a collection of web pages that share a common Uniform Resource Locator (URL) domain.

As used in the present specification and in the appended claims, the term "web page" refers to a document that can be retrieved from a server over a network connection and viewed in a web browser application.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems, devices, and methods for semantically ranking content in a website.

Referring now to FIG. 1, an illustrative system (100) for semantically ranking content in a website includes a website content ranking device (105) that has access to a website (110) stored by a website server (115). In the present example, the website content ranking device (105) and the website server (115) are separate computing devices communicatively coupled through a connection to a common network (120). However, the principles set forth in the present specification extend equally to any alternative configuration in which a website content ranking device (105) has complete access to a website (110). As such, alternative embodiments within the scope of the principles of the present specification include, but are not limited to, embodiments in which the website content ranking device (105) and the website server (115) are implemented by the same computing device, embodiments in which the website content ranking device (105) and the website server (115) communicate directly through a bus without intermediary network devices, and so embodiments in which the website content ranking device (105) has access to a stored local copy of the website (110).

The website content ranking device (105) of the present example is a computing device configured to crawl the website (110) hosted by the website server (115) and rank content present in the website (110) according to a set of semantics. Effectively, the website content ranking device (105) crawls the website (110) by requesting all web pages associated with the website (110) from the website server (115) using the appropriate network protocol (e.g., Internet Protocol ("IP")). The website content ranking device (105) may store and process each of the web pages returned from the website server (115) to rank the website content. Illustrative processes of semantically ranking the website content will be set forth in more detail below.

To achieve its desired functionality, the website content ranking device (105) includes various hardware components. Among these hardware components may be at least one processor unit (125), at least one memory unit (130), peripheral device adapters (135), and a network adapter (140). These hardware components may be interconnected through the use of one or more busses.

The processor unit (125) may include the hardware architecture necessary to retrieve executable code from the memory unit (130) and execute the executable code. The executable code may, when executed by the processing unit (125), cause the processing unit (125) to implement the functionality of crawling the website (110) and semantically ranking content from the website (110). In the course of executing code, the processing unit (125) may receive input from and provide output to one or more of the remaining hardware units.

The memory unit (130) may be configured to digitally store data consumed and produced by the processing unit (125). The memory unit (130) may include various types of memory modules, including volatile and nonvolatile memory. For example, the memory unit (130) of the present example includes Random Access Memory (RAM), Read Only Memory (ROM), other types of nonvolatile and volatile solid-state memory, and Hard Disk Drive (HDD) memory. Many other types of memory are available in the art, and the present specification contemplates the use of any type(s) of memory (130) in the memory unit (130) as may suit a particular application of the principles described herein. In certain examples, different types of memory in the memory unit (130) may be used for different data storage needs. For example, in certain embodiments the processing unit (125) may boot from ROM, maintain nonvolatile storage in the HDD memory, and execute program code stored in RAM.

The hardware adapters (135, 140) in the website content ranking device (105) are configured to enable the processing unit (125) to interface with various other hardware elements, external and internal to the website content ranking device (105). For example, peripheral device adapters (135) may provide an interface to input/output devices to create a user interface and/or access external sources of memory storage. Peripheral device adapters (135) may also create an interface between the processing unit (125) and a printer (145) or other media output device. For example, in embodiments where the website content ranking device (105) is configured to generate a document based on its automatic ranking of a website's content, the website content ranking device (105) may be further configured to instruct the printer (145) to create one or more physical copies of the document.

A network adapter (140) may be provide an interface to the network (120), thereby enabling the transmission of data to and receipt of data from other devices on the network (120), including the website server (115).

Figure 2:
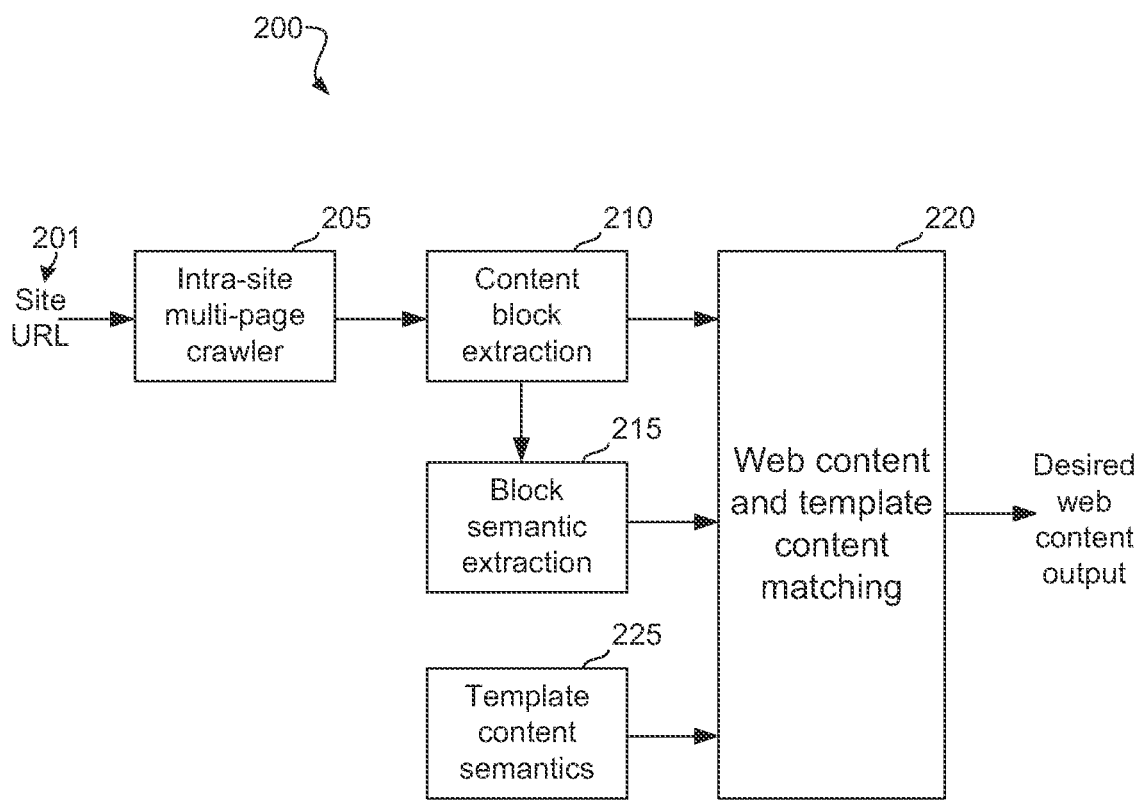
FIG. 2 is a block diagram of functional blocks implemented by an illustrative computerized website content ranking, according to one exemplary embodiment of principles described herein.

Referring now to FIG. 2, a block diagram is shown of an illustrative functionality (200) implemented by a website content ranking device (105, FIG. 1) consistent with the principles described herein. Each module in the diagram represents an element of functionality performed by the processing unit (125) of the website content ranking device (105, FIG. 1). Arrows between the modules represent the communication and interoperability among the modules.

In the example of FIG. 2, the website content ranking device (105, FIG. 1) is configured to use a template for a target document to semantically rank the content from a website according to its relevance to the template. Once the website content has been ranked, the content that is most relevant to the template can be used to automatically populate a target document with content from the website in a manner consistent with the template.

Many different types of target documents can conceivably be generated by reusing content extracted from a website. Examples of such documents include, but are in no way limited to, brochures, marketing collaterals, travel journals, newsletters, product circulars, catalogs, and the like. Different types of documents will likely have different sets of design requirements. For example, a brochure about a restaurant is likely to have a different look-and-feel from a brochure about a travel agency. Consequently, a pre-crafted template can specify the design requirements and specific types of content desired for a particular target document. Using such a template, the website content ranking device (105, FIG. 1) may perform the functionality illustrated in FIG. 2 to extract content from the web page that is most relevant to the template.

In the present example, a URL (201) for a website is received by an intra-site multi-page crawler module (205). The URL (201) may be a simple domain name (e.g., example.com) that serves as a root to all pages inside the website. Additionally or alternatively, the URL may be the web address of a single web page in cases where the website in question has only one web page. The website URL (201) may be specified by a user of the website content ranking device (105) or, alternatively, be determined automatically. The intra-site multi-page crawler module (205) may then download each web page of the website from the website server to obtain all available website content. This website content is made available to a content block extraction module (210), which partitions the website content into multiple autonomous content blocks.

Various different methods for parsing the website content into content blocks are contemplated. In some examples, the website content may be parsed into content blocks based on various criteria including, but not limited to, web pages, headings and subheadings present in the content, punctuation, image metadata, combinations thereof, and the like. Any other method of parsing the website content into content blocks may be used as suits a particular application of the principles described herein.

The substance of each content block may then be determined by a block semantic extraction module (215) and provided to a matching module (220). In certain embodiments, the substance of the content blocks may be determined using text analysis (e.g., keyword extraction) on each content block. Additionally, any other method of semantically determining the substance of each content block that suits a particular application of the principles described herein may be used.

A template content semantics module (225) provides the substance of the template to the matching module. The substance of the template may include a plurality of predefined categories, such that each category is ranked according to its relevance or importance to the template.

The matching module (220) may then assign each content block to one of the predefined categories in the template semantics based on the substance of that content block. In certain embodiments, each category may have associated keywords such that by employing keyword extraction on the content blocks, the matching module (220) may determine which of the predefined categories is most relevant to each content block. Additionally or alternatively, the matching module (220) may assign a content block to a certain predefined category based on a detected character pattern within that content block. For example, a content block having a character pattern indicative of a phone number or an email address may assigned to a "contact information" category of the template.

The content blocks may then be ranked according to the semantics of the template. For example, the content blocks may be ranked according to their corresponding assigned categories. Additionally, in certain embodiments, the content blocks may be ranked within each category according to their relevance and/or importance to that particular category.

The matching module (220) may then determine from the so categorization and ranking of the website content which of the content blocks will be included in the target document according to the template content semantics. The selected content blocks may then be outputted from the matching module (220) in the format specified by the template.

Figure 4:
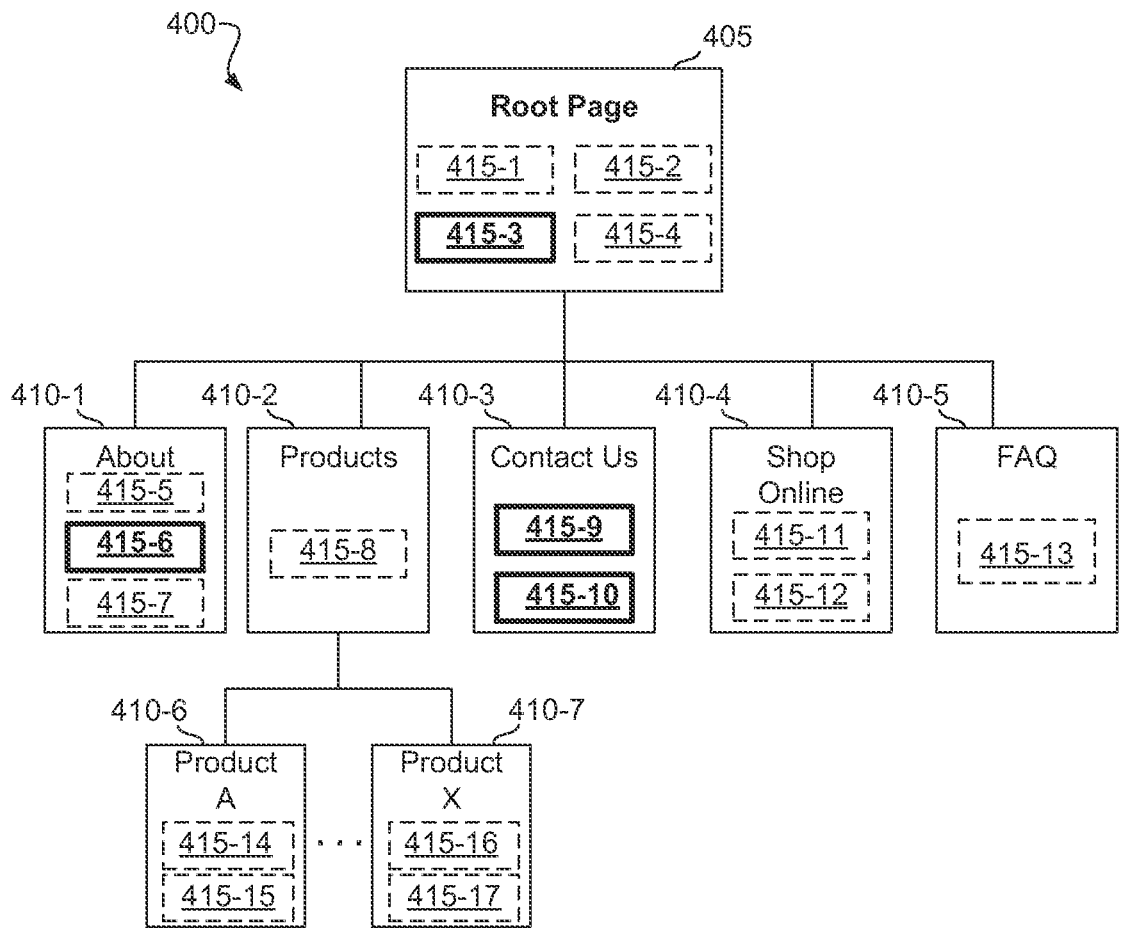
FIG. 4 is a tree diagram representing a hierarchy of an illustrative website, according to one exemplary embodiment of principles described herein.
Figure 5:
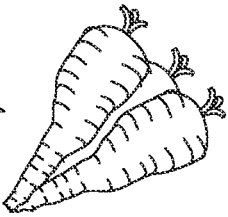
FIG. 5 is a diagram of an illustrative target article of media incorporating content extracted from a website, according to one exemplary embodiment of principles described herein.

FIGS. 3-5 illustrate a specific example of the automatic creation of a target document based on a template using content extracted from a website according to the functionality described in FIGS. 1-2.

With specific reference to FIG. 3, an illustrative template (300) for website content ranking is shown. This particular template (300) may be used to create a printed document, such as a marketing brochure using content extracted from a website. As shown in FIG. 3, the illustrative template (300) includes a page layout divided into three sections (305, 310, 315), which also correspond to categories in the template (300). These categories are "About Us," "Contact Information," and "Map." The task of a website content ranking device (105, FIG. 1), therefore, may be to determine which content from a website is most relevant to these three categories. The content ranked most relevant to these categories may then be used to automatically generate a marketing brochure based on this template (300).

FIG. 4 is a diagram of a tree hierarchy (400) of a website from which content is extracted and semantically ranked according to the principles described herein. A root web page (405) may be the default or home web page displayed initially to visitors arriving at the website. Various second-level web pages (410-1 to 410-5) may be accessed through links on the root web page (405). In the present example, these second-level web pages (410-1 to 410-5) include an "About" web page (410-1), a "Products" web page (410-2), a "Contact Us" web page (410-3), a "Shop Online" web page (410-4), and a "Frequently Asked Questions" web page (410-5). Illustrative third-level web pages (410-6, 410-7) may be accessed from the "Products" web page (410-2).

The multi-page crawler block (205, FIG. 2) of a website content ranking device (105, FIG. 1) may retrieve the website content in each of these web pages (405, 410-1 to 410-7), and a content block extraction module (210, FIG. 2) may partition the website content into a plurality of autonomous content blocks (415-1 to 415-17). These content blocks may include text blocks, images, other content objects, or a combination thereof. The block semantic extraction module (215, FIG. 2) may then determine the substance of each content block (415-1 to 415-7).

The template content semantics module (225, FIG. 2) may evaluate the semantics of the applicable template (300, FIG. 3). Specifically, the template content semantics module (225, FIG. 2) may determine the predefined categories corresponding to the sections (305, 310, 315, FIG. 3) of the template (300, FIG. 3). In the present example, the template (300, FIG. 3) includes three sections (305, 310, 315) with the categories of "About Us," "Contact Information," and "Map" respectively associated therewith. In addition to identifying these categories, the template content semantics module (225, FIG. 2) may also identify any keywords or other semantics associated with the assignment of content blocks (415-1 to 415-17) to each respective category of the template (300, FIG. 3). These keywords or other semantics may be provided by the template (300, FIG. 3), software in the website content ranking device (105, FIG. 1), or both. The categories of the template (300, FIG. 3) and semantics for assigning content blocks (415-1 to 415-7) thereto are then made available to the matching module (220, FIG. 2).

The matching module (220, FIG. 2) may then match any relevant content blocks (415-1 to 415-17) to the three categories defined by the template (300, FIG. 3) according to the substance of the content blocks (415-1 to 415-7). The relevant content blocks (415-1 to 415-17) assigned to the categories defined by the template (300, FIG. 3) are considered to be the content blocks most relevant to the template (300, FIG. 3). Additionally, the content blocks (415-1 to 415-17) in each category may be ranked to determine which content blocks (415-1 to 415-17) are the most relevant to each individual category. The content blocks (415-1 to 415-17) considered relevant to the template (300, FIG. 3) may then be used to generate a document conforming to the template (300, FIG. 3) by filling each section (305, 310, 315, FIG. 3) of the template (300, FIG. 3) beginning with the content blocks (415-1 to 415-17) determined to be most relevant to the category associated with that section so (305, 310, 315, FIG. 3) until all content blocks (415-1 to 415-17) relevant to that category are exhausted or the formatting constraints of the template (300, FIG. 3) prevent the placement of additional content blocks in that section (305, 310, 315, FIG. 3).

For purposes of illustration, suppose the matching module (220, FIG. 2) determines that content block (415-3) from the root page (405) and content block (415-6) from the "About" page (410-1) are the most relevant content blocks to the "About Us" category of the template (300, FIG. 3), and are the only two content blocks that will fit into the section (305, FIG. 3) of the template (300, FIG. 3) corresponding to the "About Us" category. Suppose that a similar determination is made regarding content block (415-9) in the "Contact Us" page (410-3) with respect to the "Contact Information" section (310, FIG. 3) of the template (300, FIG. 3) and content block (415-10) in the "Contact Us" page (410-3) with respect to the "Map" section (315, FIG. 3) of the template (300, FIG. 3).

Referring now to FIG. 5, under the above suppositions, a brochure document (500) may be automatically generated using the content blocks (415-3, 415-6, 415-9, 415-10) as shown. This brochure document may printed and/or saved as an electronic file and distributed to clients or other contacts of an owner of the website.

Figure 6:
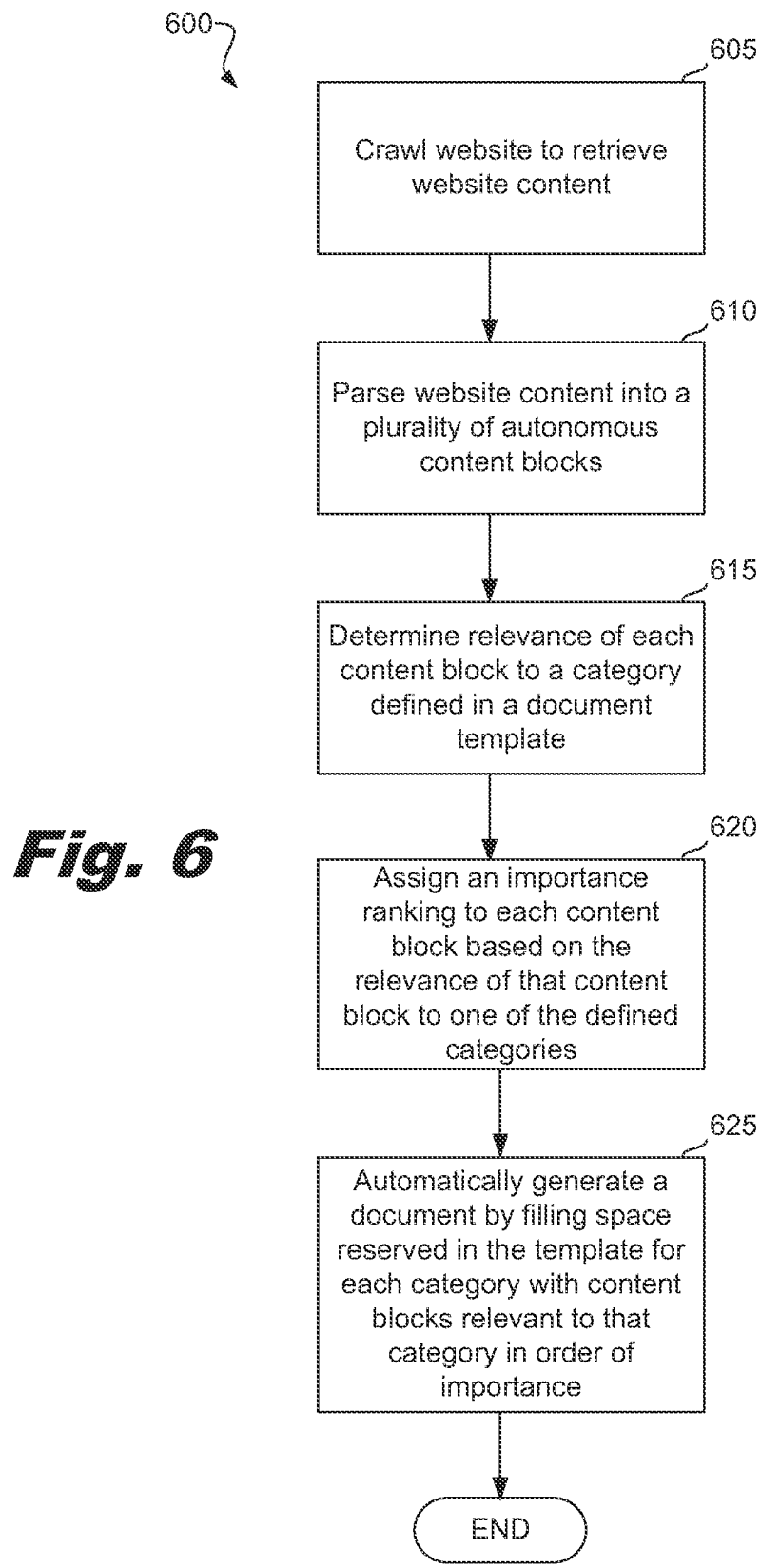
FIG. 6 is a flowchart diagram of an illustrative method of creating an article of media incorporating semantically ranked content extracted from a website, according to one exemplary embodiment of principles described herein.

Referring now to FIG. 6, a flowchart diagram is shown that summarizes the illustrative template-driven method (600) of semantically ranking content in a website to automatically generate a document based on the website. The method (600) includes crawling (step 605) the website to retrieve website content and parsing (step 610) the website content into a plurality of autonomous content blocks. The relevance of each content block to a category defined in a document template is then determined (step 615) based on the semantics of the template, and an importance ranking is assigned (step 620) to each content block based on the relevance of that content block to one of the defined categories. Finally, a document is automatically generated (step 625) by filling space reserved in the template for each category with content blocks relevant to that category in order of their assigned importance within the so constraints of the document template.

FIGS. 7-10 demonstrate a slightly different approach to the automatic generation of a document based on content obtained from a website. In this embodiment, the categorical layout of the document is not specified by a template. Rather, content objects are arranged within the layout constraints of document based on a pure importance ranking assigned to each content object. In such embodiments, the importance of a content object is determined based on how the content objects are organized in the website along with a predetermined list of content categories having weighted concept scores.

Figure 7:
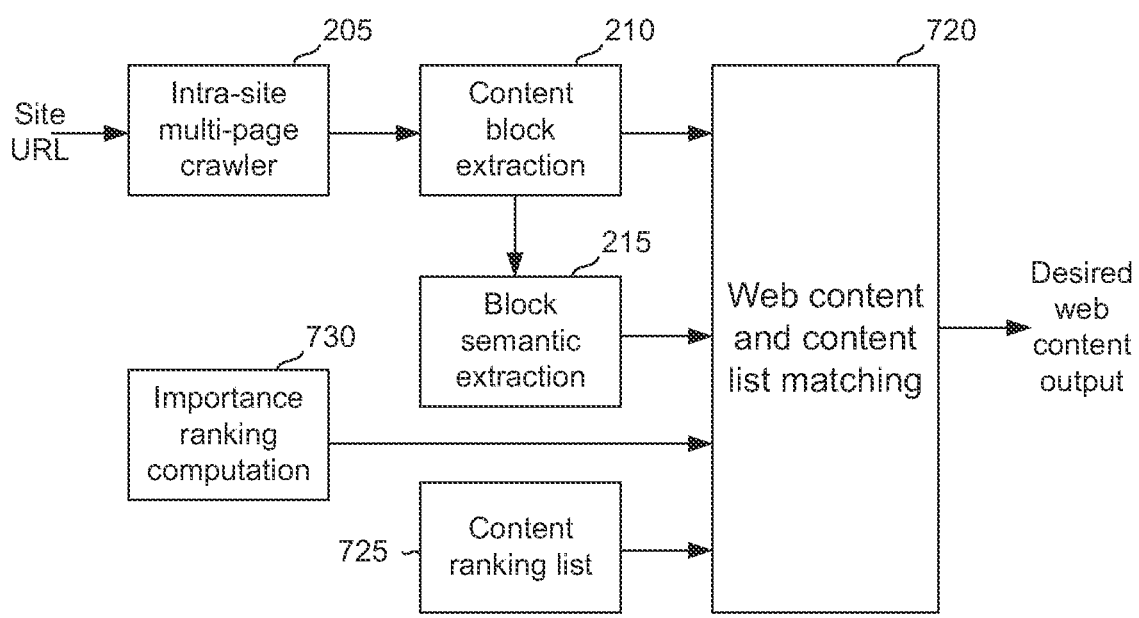
FIG. 7 is a block diagram of functional blocks implemented by an illustrative computerized website content ranking device, according to one exemplary embodiment of principles described herein.

Referring specifically now to FIG. 7, a block diagram is shown of an underlying functionality (700) of a website content ranking device (105, FIG. 1) consistent with this embodiment. The modularity functionality (700) of the present example is similar to that shown in the embodiment of FIG. 2. Some differences do exist, however. For example, the content block extraction module (710) of the present example, in addition to parsing the website content into content blocks may be configured to tag each content block with a number of clicks required to arrive at that specific content block from a root page (405, FIG. 4) of the website (i.e., the position of the content object within the website hierarchy (400, FIG. 4)). Such information is useful, as a lower number of clicks required to arrive at a content object may generally indicate a greater importance and general applicability of the information in that specific content object.

Another difference in the modular functionality (700) shown in FIG. 7 and that of FIG. 2 is that an importance ranking computation module (730) provides the matching module (720) with a rubric for determining the importance of each content object based on the position of the content object within the website hierarchy (400, FIG. 4), the degree to which a content object is relevant to any of the categories in a content ranking list (725), and the weighted importance score of the relevant category in the content ranking list (725).

FIG. 8 shows an illustrative content ranking list (725). The content ranking list includes a plurality of categories, each of the categories having an assigned importance score and associated keywords. Returning to FIG. 7, the matching module (720) may first determine the relevancy of each content object to one of the categories in the ranking list (725) through keyword matching of the text and/or metadata in a content object. The matching module (720) may then use the above described importance ranking computation rubric to assign each content block a specific semantics-based importance ranking.

A document may be automatically generated by filling an empty document with content objects according to the importance ranking of each content object, beginning with those content objects that have the highest importance. This placement of content objects will be performed consistent with the layout constraints of the particular document desired.

Figure 9:
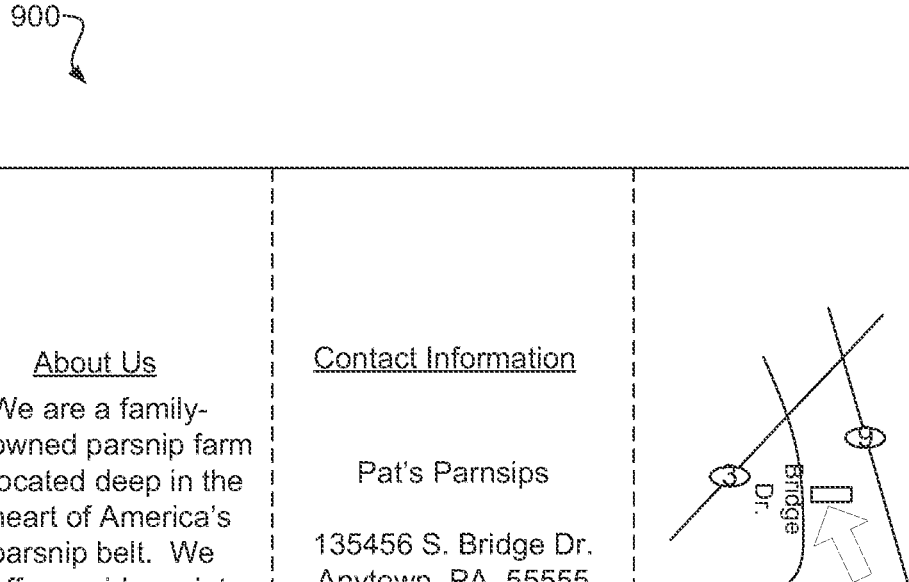
FIG. 9 is a diagram of an illustrative marketing brochure incorporating content extracted from a website, according to one exemplary embodiment of principles described herein.

Referring now to FIG. 9, an illustrative brochure document (900) that may be automatically generated based on the functionality of FIG. 7 is shown. As shown in FIG. 9, content objects associated with categories in the table of FIG. 8 are arranged in the brochure document (900) according to an order of descending importance assigned to the categories.

Figure 10:
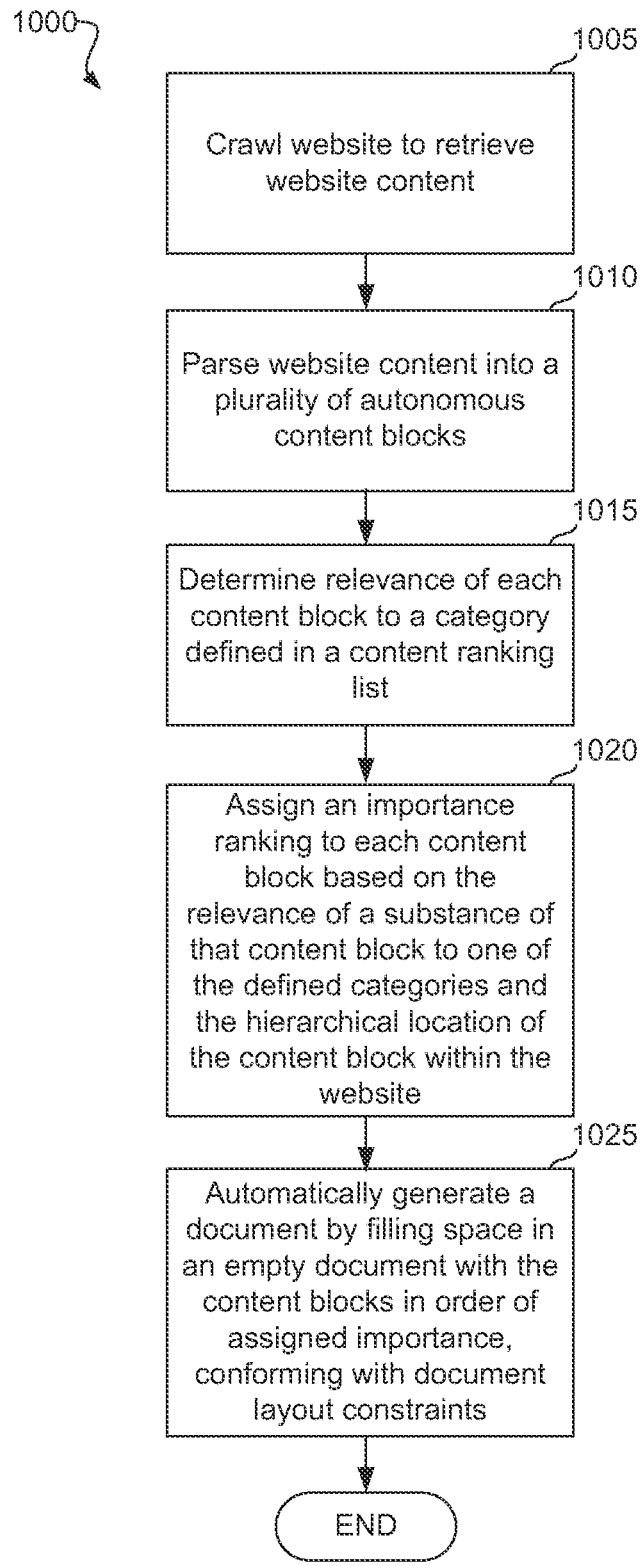
FIG. 10 is a flowchart diagram of an illustrative method of creating an article of media incorporating semantically ranked content extracted from a website, according to one exemplary embodiment of principles described herein.

Referring now to FIG. 10, a flowchart diagram is shown that summarizes the illustrative template-driven method (1000) of semantically ranking content in a website to automatically generate a document based on the website. The method (1000) includes crawling (step 1005) the website to retrieve website content and parsing (step 1010) the website content into a plurality of autonomous content blocks. The relevance of the substance of each content block to a category defined in a content ranking list is then determined (step 1015) based on the semantics of the content ranking list. An importance ranking is assigned (step 1020) to each content block based on the relevance of the substance of that content block to one of the defined categories and the hierarchical location of the content block within the website. Finally, a document is automatically generated (step 1025) by filling space in an empty document with the content blocks in an order of assigned importance within the constraints of the document template.

The preceding description has been presented only to illustrate so and describe embodiments and examples of the principles described. This description is not intended to be exhaustive or to limit these principles to any precise form disclosed. Many modifications and variations are possible in light of the above teaching.

What is claimed is:

1. A method of semantically ranking content in a website using a computerized ranking device comprising at least one processor, said method comprising:
   parsing content from said website into a plurality of autonomous content blocks with said computerized ranking device; and
   for each of said content blocks, assigning an importance ranking with said computerized ranking device to said content block based on a degree to which a substance of said content block is relevant to one of a plurality of predefined categories, said importance ranking assignment is additionally based on a location of said content block within a hierarchical structure of said website.

2. The method according to claim 1, in which said website comprises a plurality of distinct web pages and said content is parsed from each of said web pages.

3. The method according to claim 1, further comprising performing keyword analysis on each said content block to determine said degree to which said substance of said content block is relevant to said one of said plurality of predefined categories.

4. The method according to claim 1, in which said importance ranking assignment is additionally based on a weighted importance score of a said predefined category to which said content object is most relevant.

5. The method according to claim 1, further comprising automatically arranging at least some of said content blocks into a document according to said importance rankings of said content blocks.

6. The method according to claim 5, in which said content blocks are arranged into said document in conformity with a document template, said document template specifying said predefined categories and a space in said document allocated to each of said predefined categories.

7. The method according to claim 5, in which said content blocks are arranged into said document in a descending order of importance determined by said importance rankings assigned to said content blocks.

8. The method of claim 5, wherein the document comprises a brochure that includes at least some of the content blocks from the website.

9. The method of claim 1, wherein parsing content from the website into content blocks is based on any of headings, subheadings, punctuation and metadata.

10. The method of claim 1, further comprising tagging each content block with a number of clicks required to arrive at that specific content block from a root page of said website.

11. A computerized ranking device for semantically ranking content in a website, said computerized ranking device comprising:
   a processor: and
   a memory communicatively coupled to said processor, said memory comprising executable code stored thereon such that said processor is configured to, when executing said executable code:
   crawl a website to obtain content from said website;
   parse said content from said website into a plurality of autonomous content blocks; and
   assign each content block an importance ranking based on a degree to which a substance of said content block is relevant to one of a plurality of predefined categories, said importance ranking assignment is additionally based on a location of said content block within a hierarchical structure of said website.

12. The computerized ranking device according to claim 11, in which said processor is further configured to perform keyword analysis on each said content block to determine said degree to which said substance of said content block is relevant to said one of said plurality of predefined categories.

13. The computerized ranking device according to claim 11, in which said importance ranking assignment is additionally based on a weighted importance score assigned to a said predefined category to which said content object is most relevant.

14. The computerized ranking device according to claim 11, in which said processor is further configured to automatically arrange at least some of said content blocks into a document so according to said importance rankings of said content blocks.

15. The computerized ranking device according to claim 14, in which said content blocks are arranged into said document in conformity with a document template, said document template specifying said predefined categories and a space in said document allocated to each of said predefined categories.

16. The computerized ranking device of claim 11, wherein the processor is configured to parse the content from the website into content blocks is based on any of headings, subheadings, punctuation and metadata.

17. The computerized ranking device of claim 11, wherein the processor is configured to tag each content block with a number of clicks required to arrive at that specific content block from a root page of said website.

18. A system for creating a printed document based on semantically ranked content in a website; said system comprising:
   a printing device;
   a processor communicatively coupled to said printing device; and
   a memory communicatively coupled to said processor, said memory comprising executable code stored thereon such that said processor is configured to, when executing said code:
   crawl a website to obtain content from said website;
   parse said content from said website into a plurality of autonomous content blocks;
   assign each content block an importance ranking based on a degree to which a substance of said content block is relevant to one of a plurality of predefined categories, said importance ranking assignment is additionally based on a location of said content block within a hierarchical structure of said website;
   arrange at least some of said content blocks into a document based on said importance rankings of said content blocks; and
   cause said printing device to print said document.

* * * * *